(12) United States Patent
Okamura et al.

(10) Patent No.: US 6,705,281 B2
(45) Date of Patent: Mar. 16, 2004

(54) PISTON FOR AN INTERNAL COMBUSTION ENGINE

(75) Inventors: Eiji Okamura, Kanagawa (JP); Seiichi Sue, Kanagawa (JP); Hidehiko Koyashiki, Gunma (JP); Kazumitsu Kobayashi, Gunma (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/131,032

(22) Filed: Apr. 25, 2002

(65) Prior Publication Data

US 2002/0157638 A1 Oct. 31, 2002

(30) Foreign Application Priority Data

Apr. 27, 2001 (JP) .......................... 2001-132526

(51) Int. Cl.[7] .............................. F02B 31/00; F02F 3/28
(52) U.S. Cl. ........................ 123/306; 123/279
(58) Field of Search .............................. 123/302, 306, 123/307, 308, 309, 315, 262, 263, 269, 279, 286, 285

(56) References Cited

U.S. PATENT DOCUMENTS

| | | | | |
|---|---|---|---|---|
| 5,417,190 A | * | 5/1995 | Ando et al. | 123/308 |
| 5,642,706 A | * | 7/1997 | Wirth et al. | 123/305 |
| 5,711,269 A | * | 1/1998 | Oda et al. | 123/262 |
| 5,727,520 A | * | 3/1998 | Wirth et al. | 123/305 |
| 5,878,712 A | * | 3/1999 | Wolters et al. | 123/301 |
| 5,921,215 A | * | 7/1999 | Wirth et al. | 123/298 |
| 5,943,993 A | * | 8/1999 | Carstensen et al. | 123/228 |
| 5,979,399 A | * | 11/1999 | Piock et al. | 123/301 |
| 6,047,592 A | * | 4/2000 | Wirth et al. | 73/116 |
| 6,062,192 A | * | 5/2000 | Wirth et al. | 123/295 |
| 6,125,817 A | * | 10/2000 | Piock et al. | 123/301 |
| 6,418,905 B1 | * | 7/2002 | Baudlot et al. | 123/301 |

FOREIGN PATENT DOCUMENTS

| | | | | |
|---|---|---|---|---|
| JP | 246877 | * | 9/1996 | ........... F02B/23/08 |
| JP | 9-317555 | | 12/1997 | |

* cited by examiner

Primary Examiner—Mahmoud Gimie
Assistant Examiner—Hai Huynh
(74) Attorney, Agent, or Firm—Foley & Lardner

(57) ABSTRACT

A piston for an internal combustion engine is provided which has at a top surface thereof a cavity for causing a mixture charge drawn from an intake port into a combustion chamber so as to flow with a rotational motion about a horizontal axis to flow toward a spark plug. A combustion chamber structure for an internal combustion engine is also provided.

13 Claims, 6 Drawing Sheets

PISTON FOR AN INTERNAL COMBUSTION ENGINE

BACKGROUND OF THE INVENTION

The present invention relates to a piston for an internal combustion engine and more particularly to a piston capable of making shorter the distance that a mixture charge drawn into a combustion chamber so as to flow with a rotational motion about a horizontal axis travels before reaching a spark plug. The present invention further relates to a combustion chamber structure having such a piston.

In a conventional internal combustion engine having a piston reciprocatingly disposed in a cylinder, a mixture charge is drawn from an intake port into a combustion chamber so as flow with a rotational motion about a horizontal axis and ignited by a spark plug after reaching the spark plug or a place adjacent thereto. The term "horizontal" is herein used to indicate an axis that transverses or extends across an axis of a combustion chamber.

In order to obtain efficient combustion of a mixture charge drawn into a combustion chamber, it has been proposed, as disclosed in Japanese Patent Provisional Publication No. 9-317555, such a piston that has at a top surface thereof a pair of nearly oval-shaped depressions each located under a pair of intake and exhaust valves. By such depressions, a mixture charge drawn into the combustion chamber from a pair of intake ports can be assuredly formed into a pair of flows that moves with a rotational motion about a horizontal axis.

The piston disclosed by Japanese Patent Provisional Publication No. 9-317555 is advantageous since liquid fuel affixed to the inside of the depressions is removed by the flows efficiently such that formation of deposits on the piston is prevented.

SUMMARY OF THE INVENTION

Specifically, in an internal combustion engine having such a piston disclosed by the above-described publication, a mixture charge is drawn from each intake port into the combustion chamber and made to flow with a rotational motion about a horizontal axis in the following manner. Firstly, the mixture charge is made to flow along an inner surface of a cylinder head toward an exhaust valve. From the exhaust valve, the mixture charge is made to flow along an inner surface of a cylinder toward a top surface of a piston. From the top surface of the piston, the mixture charge is made to flow again along the inner surface of the cylinder and then toward the spark plug provided to the cylinder head.

Thus, the distance that the mixture charge travels within the combustion chamber before reaching the spark plug is so long that there is a possibility that when the engine is operated in a high-speed range, the spark plug is ignited before the mixture charge reaches the spark plug or a place adjacent thereto thereby making it impossible to obtain good combustion.

It is accordingly an object of the present invention to provide a piston for an internal combustion engine that is capable of making shorter the distance that a mixture charge drawn from an intake port into a combustion chamber so as to flow with a rotational motion about a horizontal axis travels before reaching a spark plug thereby making it assured to attain good combustion even when the engine is operated in a high-speed range.

It is another object of the present invention to provide a combustion chamber structure for an internal combustion engine having a piston of the foregoing character.

To accomplish the above objects, there is provided according to an aspect of the present invention a piston for an internal combustion engine having a cylinder, a cylinder head closing an end of the cylinder and having an inner surface defining a combustion chamber, a spark plug mounted on the cylinder head, an intake valve mounted on the cylinder head on one of opposite sides of the spark plug and an exhaust valve mounted on the cylinder head on the other of the opposite sides of the spark plug, the piston being reciprocatingly disposed in the cylinder and having at the top surface a cavity for causing a mixture charge drawn into the combustion chamber so as to flow with a rotational motion about a horizontal axis upon opening of the intake valve to flow toward the spark plug.

According to another aspect of the present invention, there is provided a piston for an internal combustion engine having a cylinder, a cylinder head closing an end of the cylinder and having an inner surface defining a combustion chamber, a spark plug mounted on the cylinder head, an intake valve mounted on the cylinder head on one of opposite sides of the spark plug and an exhaust valve mounted on the cylinder head on the other of the opposite sides of the spark plug, the piston being reciprocatingly disposed in the cylinder and having at the top surface a cavity that causes a mixture charge drawn into the combustion chamber so as to flow with a rotational motion about a horizontal axis upon opening of the intake valve to flow upward from a place adjacent a center of the top surface of the piston and toward the spark plug.

According to a further aspect of the present invention, there is provided a combustion chamber structure for an internal combustion engine comprising a cylinder block having a cylinder, a cylinder head closing an end of the cylinder and having an inner surface defining a pentroof-shaped combustion chamber, the inner surface of the cylinder head having a pair of inclined surface sections, at least one intake port formed in one of the inclined surface sections of the cylinder head, at least one exhaust port formed in the other of the inclined surface sections of the cylinder head, and a spark plug disposed between the inclined surface sections of the cylinder head, a mixture charge drawn from the intake port into the combustion chamber being made to flow with a rotational motion about a horizontal axis, and a piston reciprocatingly disposed in the cylinder and having at a top surface thereof a cavity for causing the mixture charge drawn into the combustion chamber to flow toward the spark plug.

The other objects and features of this invention will become understood from the following description with reference to the accompanying drawings.

DESCRIPTION OF THE PREFERRED EMBODIMENTS

Figure 1:
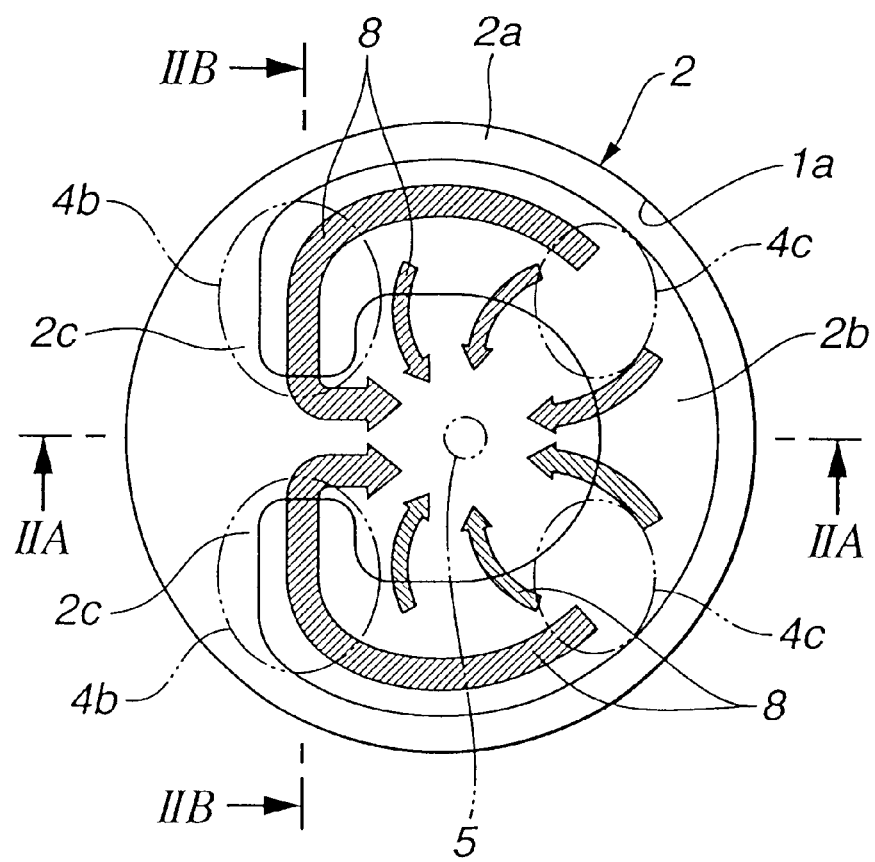
FIG. 1 is a top plan view of a piston for an internal combustion engine according to a first embodiment of the present invention.
Figure 2A:
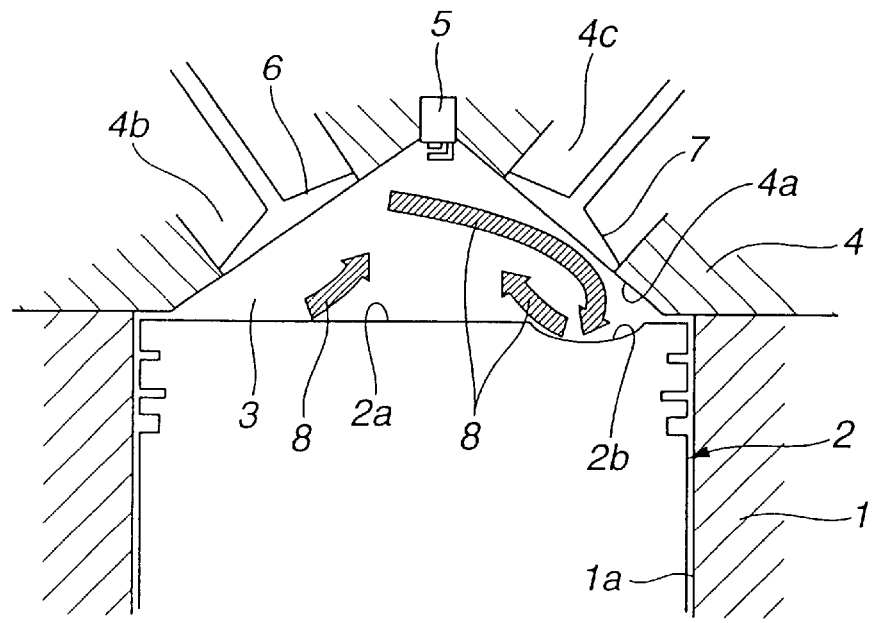
FIG. 2A is a sectional view taken along line IIA—IIA of FIG. 1.
Figure 2B:
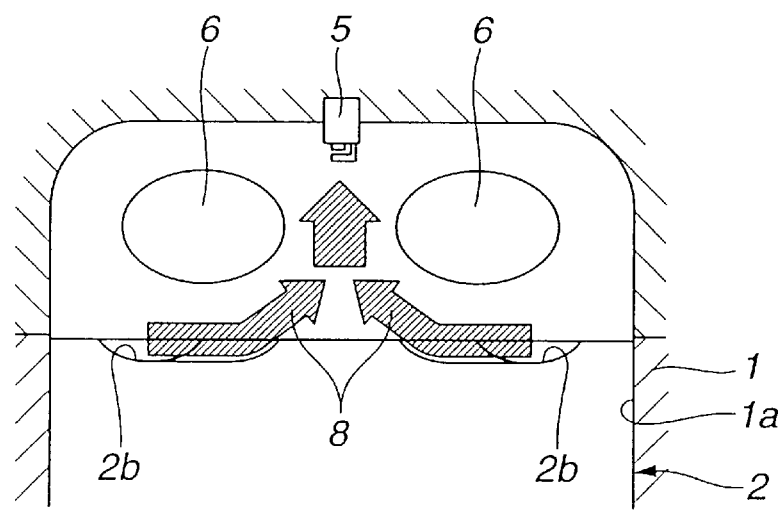
FIG. 2B is a sectional view taken along line IIB—IIB of FIG. 1.

Referring first to FIGS. 1 and 2A–2B, a cylinder block is indicated by 1 and formed with a plurality of cylinders 1a though only one is shown. Within each cylinder 1a is reciprocatingly disposed piston 2.

On an upper surface of cylinder block 1 is disposed cylinder head 4 to close an end of each cylinder 1a. Cylinder head 4 has an inner surface 4a defining combustion chamber 3. Inner surface 4a has a pair of inclined surface sections that are inverted V-shaped when viewed in section as shown in FIG. 2A so that combustion chamber 3 is pentroof-shaped. Spark plug 5 is removably mounted on cylinder head 4 so as to be positioned at an apex portion of inner surface 4a, i. e., between the inclined surface sections of inner surface 4a.

Cylinder head 4 is provided with a pair of intake ports 4b at one of the inclined surface sections and a pair of exhaust ports 4c at the other of the inclined surface sections. Intake ports 4b and exhaust ports 4c are disposed opposite to each other, with spark plug 5 being positioned therebetween. Intake valves 6 and exhaust valves 7 are installed in intake ports 4b and exhaust ports 4c, respectively.

Intake and exhaust valves 6 and 7 are driven by unshown cams so as to open and close intake and exhaust ports 4b and 4c. When intake valves 6 open, mixture charge 8 is drawn from intake ports 4b into combustion chamber 3 so as to form a pair of flows that moves with a rotational motion about a horizontal axis. When exhaust valves 7 open, exhaust gases are emitted through exhaust ports 4c.

Piston 2 has at top surface 2a thereof cavity 2b for causing mixture charge 8 drawn into combustion chamber 3 so as to flow with a rotational motion about a horizontal axis upon opening of intake valves 6 to flow directly toward spark plug 5.

Cavity 2b is nearly C-shaped or horseshoe-shaped when viewed in plan as shown in FIG. 1 in order to make shorter the distance that mixture charge 8 travels within combustion chamber 3 before reaching spark plug 5.

Cavity 2b extends circumferentially to have opposite longitudinal end portions 2c that are positioned under intake valves 6, respectively. Specifically, opposite end portions 2c are bent inward so as to be generally straight and arranged in line and opposite to each other. At a longitudinal end of each end portion 2c, cavity 2b is concavely curved or inclined as shown in FIG. 2B so as to cause mixture charge 8 reaching opposite end portions 2c to flow directly toward spark plug 5. Cavity 2b has between opposite end portions 2c a curved intermediate portion with a part-circular outer circumferential periphery concentric with an outer circumference of piston 2 and an inner circumferential periphery that is curved so as to surround spark plug 5. As seen from FIG. 1, cavity 2b is formed so as to be wider at the curved intermediate portion and is narrower at longitudinal end portions 2c, i.e., wider at an inlet where mixture charge 8 is made to flow into cavity 2b and narrower at an outlet where mixture charge 8 is made to flow out of cavity 2b. Cavity 2b may be formed so as to become narrower gradually toward the outlet.

The bottom surface of the intermediate portion of cavity 2b is concavely curved or inclined as shown in FIG. 2A so as to cause mixture charge 8 reaching cavity 2b to flow directly toward spark plug 5.

The operation of piston 2 will now be described.

When intake valves 6 open, being driven by cams that are rotatable in response to an operation of an engine, mixture charge 8 is drawn from intake ports 4 into combustion chamber 3 so as to form a pair of flows that moves with a rotational motion about a horizontal axis.

Mixture charge 8 drawn from each intake port 4b into combustion chamber 3 is made to flow along inner surface 4a of cylinder head 4 toward exhaust valve 7 and into nearly C-shaped cavity 2b formed in top surface 2a of piston 2 as shown in FIG. 2A.

Mixture charge 8 is then made to flow along the outer circumferential periphery of cavity 2b toward longitudinal end portion 2c as shown in FIG. 1. Simultaneously with this, a portion of mixture charge 8 is made to flow directly toward spark plug 4 with a relatively sharp rotational motion, being guided by concavely curved bottom surface of cavity 2b. Further, since longitudinal end portions 2c of cavity 2b are generally straight and arranged in line and opposite to each other, mixture charge 8 that flows out of end portions 2c of cavity 2b is not made to flow toward intake port 4b but to flow directly toward spark plug 5 as shown in FIG. 2B.

Thus, mixture charge 8 is mainly made to flow along the outer circumferential periphery of cavity 2b toward longitudinal end portion 2c, while allowing a portion of mixture charge 8 to be made to flow directly toward spark plug 4 with a relatively sharp rotational motion, being guided by concavely curved bottom surface of cavity 2b. Namely, a main flow of mixture charge 8 along the outer circumferential periphery of cavity 2b is formed so as to surround secondary flows of mixture charge 8 without interfering therewith. Thus, it becomes possible to make considerably shorter the distance that mixture charge 8 drawn from each intake port 4b into combustion chamber 3 so as to flow with a rotational motion about a horizontal axis travels before reaching spark plug 5. As a result, it never occurs that spark plug 5 is ignited before mixture charge 8 reaches spark plug 5 or a place adjacent thereto. Thus, it becomes possible to obtain good combustion assuredly even when the engine is operated in a high-speed range.

Figure 3:
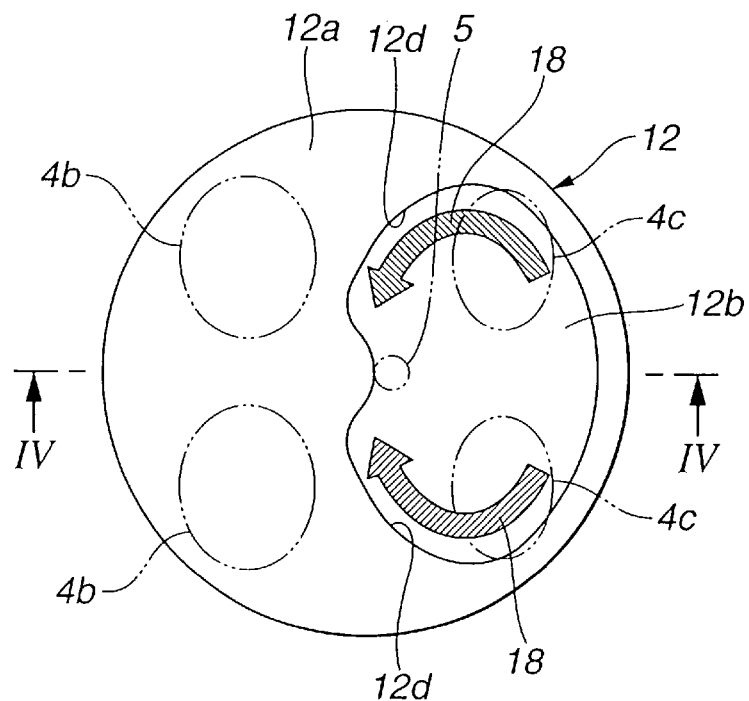
FIG. 3 is a top plan view of a piston for an internal combustion engine according a second embodiment of the present invention.
Figure 4:
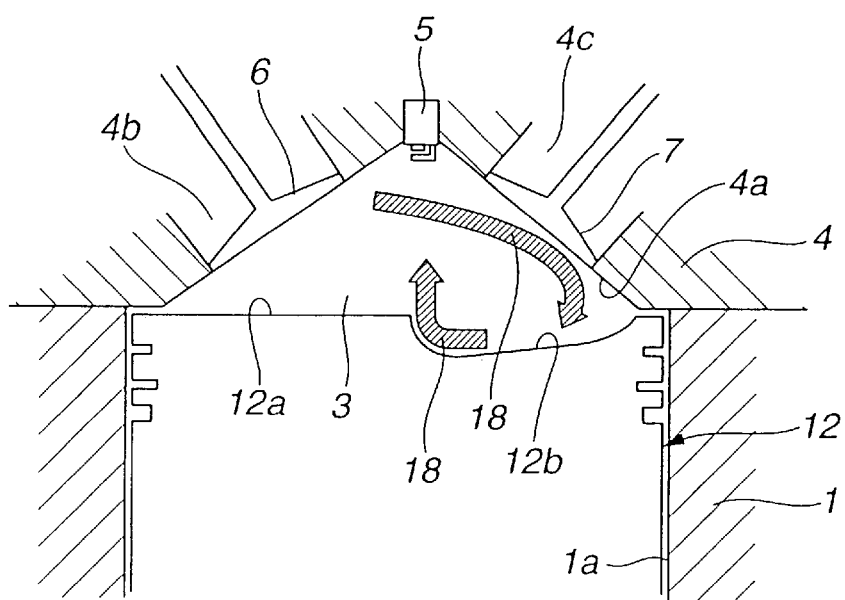
FIG. 4 is a sectional view taken along line IV—IV of FIG. 3.

FIGS. 3 and 4 shows a second embodiment of the present invention. In FIGS. 3 and 4, like parts and portions to those of the first embodiment described with reference to FIGS. 1 and 2A–2B are designated by like reference characters and will not be described again for brevity.

In this embodiment, top surface 12a of piston 12 is formed with cavity 12b having a cocoon-like or peanut-like shape when viewed in plan as shown in FIG. 3. Cavity 12b extends from a place adjacently under spark plug 5 to a place under exhaust valves 4c. Further, cavity 12b extends circumferentially to cause mixture charge 18 to flow circumferentially and has an end portion that is curved or inclined so as to cause mixture charge 18 to flow directly toward spark plug 5. More specifically, cavity 12b has a part-circular outer circumferential periphery concentric with an outer circumference of piston 12 and an inner circumferential periphery that is curved with a smaller radius of curvature and located adjacent the center of piston 12. In other words, cavity 12b is wider at an inlet where mixture charge 18 is made to flow into cavity 12b and narrower at an outlet where mixture charge 18 is made to flow out of cavity 12b. Cavity 12b becomes narrower gradually toward the outlet. Further, the bottom surface of cavity 12 is inclined so as to cause mixture charge 18 to flow directly toward spark plug 5.

By this structure, when mixture charge 18 drawn from each intake port 4b into combustion chamber 3 so as to flow with a rotational motion about a horizontal axis reaches cavity 12b, it is made to flow circumferentially and then radially inward along curved radial periphery 12d connecting between inner and outer circumferential peripheries of cavity 12b, thereby being directed toward spark plug 5. Thus, similarly to the first embodiment, this embodiment can make shorter the distance that mixture charge 18 drawn from intake port 4b into combustion chamber 3 so as to flow with a rotational motion about a horizontal axis travels before reaching spark plug 5. Further, this embodiment makes it assured for mixture charge 18 tending to flow radially outward to be made to flow toward spark plug 5. Except for the above this embodiment is substantially similar to the first embodiment and can produce substantially the same effect.

Figure 5:
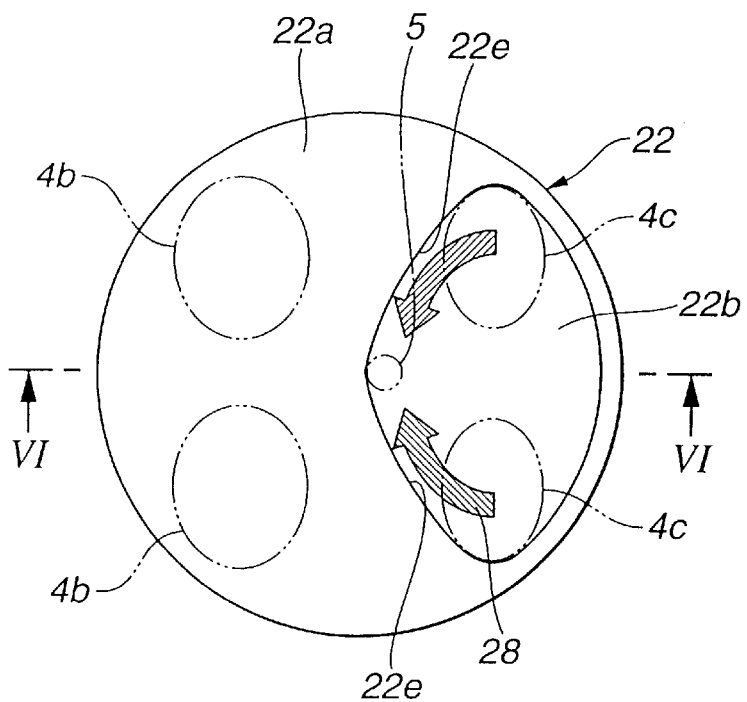
FIG. 5 is a top plan view of a piston for an internal combustion engine according to a third embodiment of the present invention.
Figure 6:
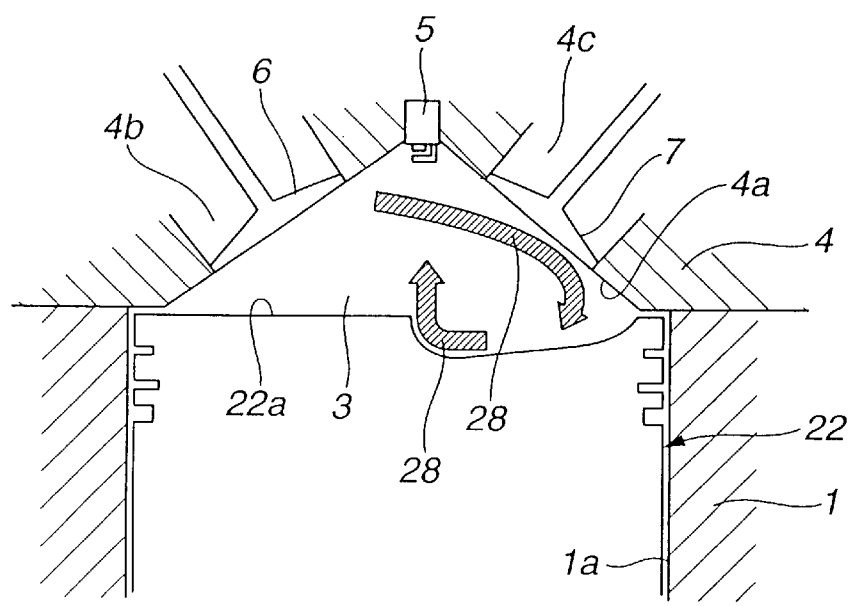
FIG. 6 is a sectional view taken along line VI—VI of FIG. 5.

FIGS. 5 and 6 show a third embodiment of the present invention. In FIGS. 5 and 6, like parts and portions to those of the second embodiment described with reference to FIGS. 3 and 4 are designated by like reference characters and will not be described again for brevity.

In this embodiment, top surface 22a of piston 22 is formed with cavity 22 having a clamshell-like or fan-like shape when viewed in plan. Cavity 22b has a part-circular outer circumferential periphery concentric with an outer circumference of piston 22 and a pair of curved radial peripheries connected to opposite ends of the outer circumferential periphery and extending toward the center of piston 22.

By the structure, mixture charge 28 drawn from intake ports 4b into combustion chamber 3 so as to flow with a rotational motion about a horizontal axis is made to flow as indicated by the arrows in FIGS. 5 and 6. Namely, after mixture charge 28 flows into cavity 22b, it is made to flow directly toward spark plug 5 along curved radial peripheries 22e connecting between the opposite ends of the outer circumferential periphery and the center of piston 22. Thus, it becomes possible to make shorter the distance that mixture charge 28 drawn from intake port 4b into combustion chamber 3 so as to flow with a rotational motion about a horizontal axis travels before reaching spark plug 5. Except for the above this embodiment is substantially similar to the second embodiment and can produce substantially the same effect.

Figure 7:
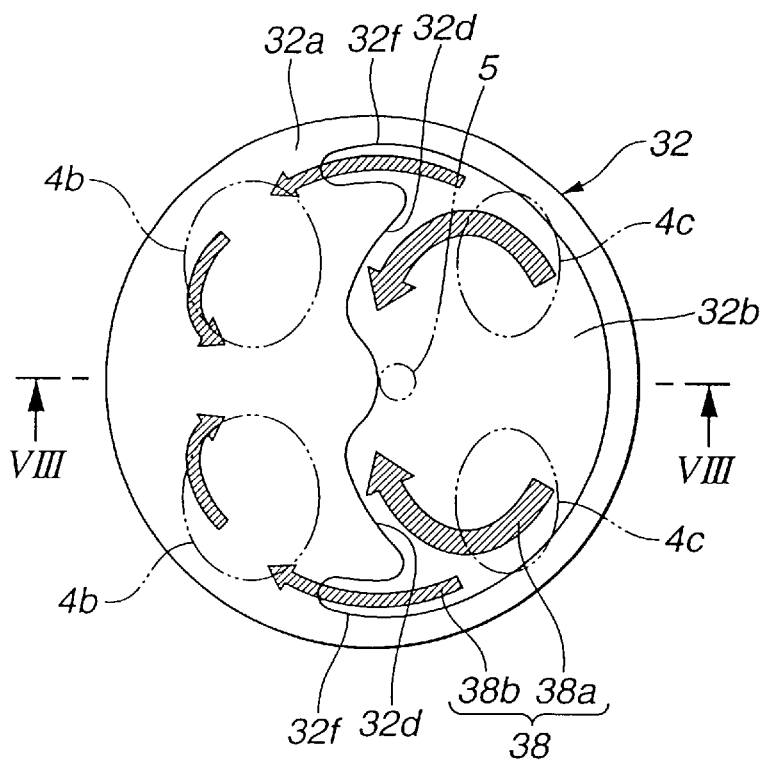
FIG. 7 is a top plan view of a piston for an internal combustion engine according to a fourth embodiment of the present invention.
Figure 8:
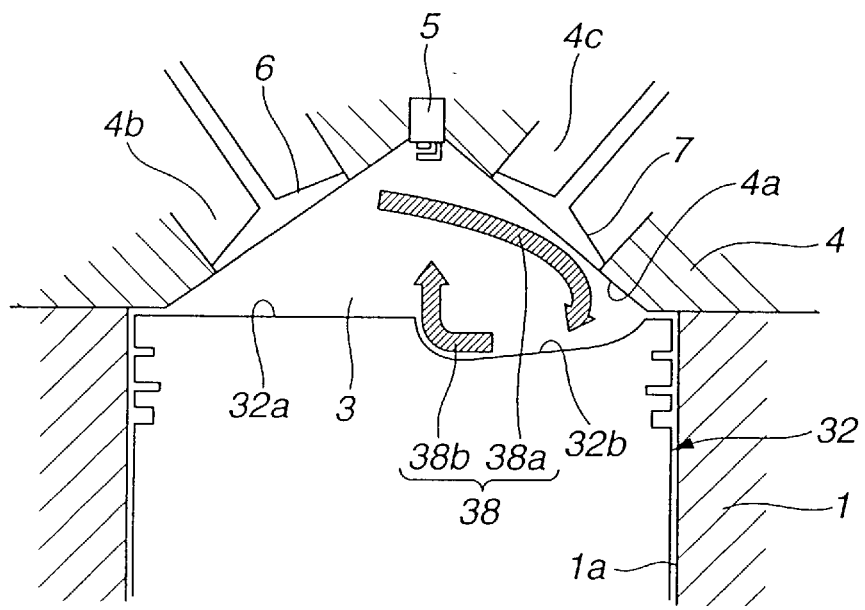
FIG. 8 is a sectional view taken along line VIII—VIII of FIG. 7.

FIGS. 7 and 8 show a fourth embodiment of the present invention. In FIGS. 7 and 8, like parts and portions to those of the second embodiment described with reference to FIGS. 3 and 4 are designated by like reference characters and will not be described again for brevity.

In this embodiment, top surface 32a of piston 32 is formed with cavity 32b having a cocoon-like or peanut-like shape and a pair of arcuated branch cavities 32f branching off from opposite radially outer circumferential end portions of cavity 32f when viewed in plan as shown in FIG. 7. Cavity 32b has a part-circular outer circumferential periphery concentric with an outer circumference of piston 32 when viewed in plan. Cavity 32b has an inner circumferential periphery that is curved with a small radius of curvature and located adjacent the center of piston 32.

By this structure, when mixture charge 38 is drawn from intake ports 4b into combustion chamber 3 so as to flow with a rotational motion about a horizontal axis, it is made to flow as indicated by the arrows in FIGS. 7 and 8. Namely, when mixture charge 38 flows into cavity 32b, main portion 38a of mixture charge 38 is made to flow directly toward spark plug 5, being guided by curved radial peripheries 32d connecting between inner and outer circumferential peripheries of cavity 32b, and secondary portions 38b of mixture charge 38 that are separated from main portion 38a to flow circumferentially by means of branch cavities 32f are made to flow toward spark plug 5, being guided by inner surface 4a of cylinder head 4. Thus, similarly to the second embodiment, this embodiment can make shorter the distance that mixture charge 38 drawn from intake port 4b into combustion chamber 3 so as to flow with a rotational motion about a horizontal axis travels before reaching spark plug 5. Except for the above this embodiment is substantially similar to the second embodiment and can produce substantially the same effect.

Figure 9:
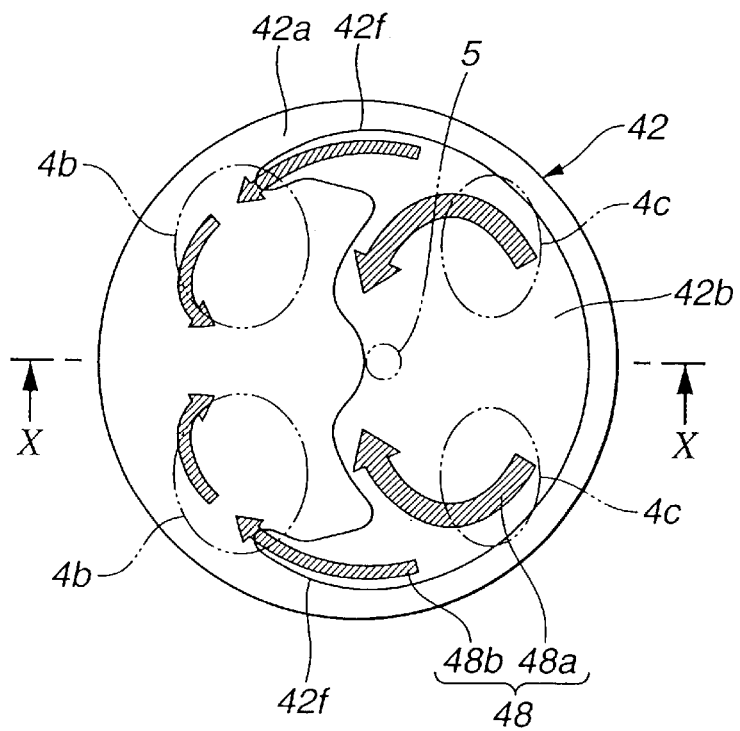
FIG. 9 is a top plan view of a piston for an internal combustion engine according to a fifth embodiment of the present invention.
Figure 10:
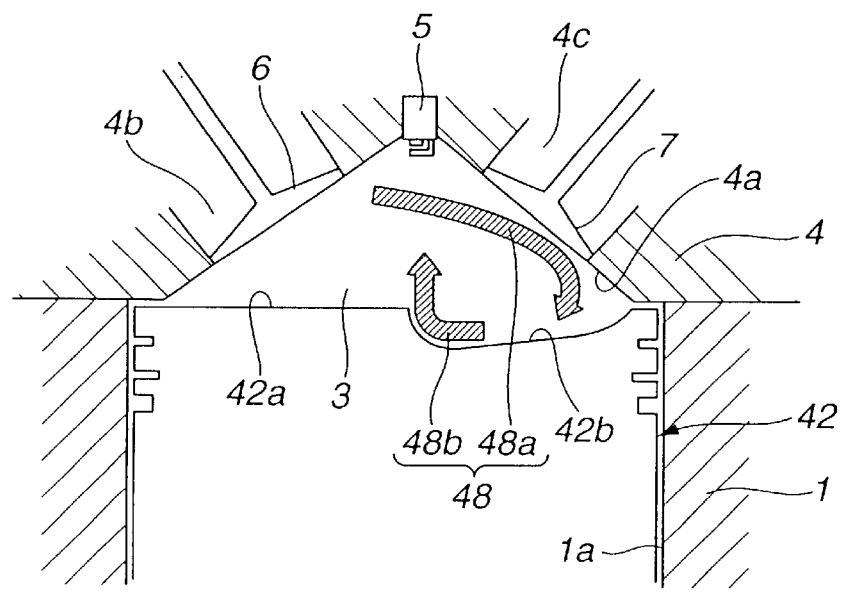
FIG. 10 is a sectional view taken along line X—X of FIG.9.

FIGS. 9 and 10 show a fifth embodiment of the present invention. In FIGS. 9 and 10, like parts and portions to those of the fourth embodiment described with reference to FIGS. 7 and 8 are designated by like reference characters and will not be described again for brevity.

In this embodiment, similarly to the fourth embodiment, top surface 42a of piston 42 is formed with cavity 42b and a pair of branch cavities 42f.

This embodiment differs from the fourth embodiment in that branch cavities 42f each have a wider inlet so that secondary portion 48b of mixture 48 is separated in a larger amount from main portion 48a.

By this embodiment, since secondary portions 48b of mixture 48 that are separated from main portion 38a by branch cavities 32f is made to flow toward spark plug 5 at the speed that increases as they go nearer to spark plug 5, secondary portions 48b scarcely lag behind main portion 48a in reaching spark plug 5.

Except for the above, this embodiment is substantially to the fourth embodiment and can produce substantially the same effect.

From the foregoing, it will be understood that according to the present invention a piston for an internal combustion engine is formed at a top surface thereof with a cavity for causing a mixture charge drawn from an intake port into a combustion chamber so as to flow with a rotational motion about a horizontal axis to flow directly toward a spark plug. By this, it becomes possible to make shorter the distance that the mixture charge travels within the combustion chamber before reaching the spark plug. Thus, it never occurs such a case that a spark plug is ignited before the mixture charge reaches the spark plug and it becomes assured to obtain good combustion even when the engine is operated in a high-speed range.

It will be further understood that according to the present invention the cavity is so formed as to extend from a place adjacently under the spark plug to a place under the exhaust valve and the cavity has a bottom surface that is inclined so as to cause the mixture charge to flow directly toward the spark plug. By this, it becomes possible to cause an increased amount of mixture charge to flow directly toward the spark plug, while making smaller the amount of mixture charge that flows over the spark plug into the exhaust valve side.

It will be further understood that according to the present invention the cavity extends circumferentially to cause the mixture charge to flow circumferentially and has an end portion that is inclined so as to cause the mixture charge to flow directly toward the spark plug. By the cooperation of the inclined bottom surface extending from a place adjacently under the spark plug to a place under the exhaust valve and the inclined end portion of the cavity, the mixture charge can be made to flow directly toward the spark plug with efficiency and assuredness.

It will be further understood that according to the present invention the cavity is provided with a branch portion extending circumferentially therefrom for causing part of the mixture charge to flow separately. Such a branch portion is effective for causing the mixture charge to flow directly toward the spark plug with more efficiency.

It will be further understood that according to the present invention the cavity and/or the branch portion thereof is wider at an inlet than at an outlet and becomes narrower gradually toward the outlet end. By this, since a portion of the mixture charge that is made to flow toward the spark plug by the end portion or the branch portion of the cavity can flow at the speed that increases as it goes nearer to the spark plug, the portion of the mixture charge scarcely lags behind the other portion in reaching the spark plug.

The entire contents of Japanese Patent Application No. 2001-132526 (filed Apr. 27, 2001) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while in the fourth embodiment of FIGS. 7 and 8 or the fifth embodiment of FIGS. 9 and 10, a pair of branch cavities 32f or 42f is provided to outer circumferential portion of cavity 32b or 42b, this is not for the purpose of limitation but plural pairs of branch cavities may be provided. Further, while longitudinal end portions 2c of C-shaped cavity 2b is formed so as to be substantially uniform in width, this is not for the purpose of limitation but longitudinal end portions 2c may be formed so as to taper toward tip ends so that mixture 8 is made to flow at higher speed. The scope of the invention is defined with reference to the following claims.

What is claimed is:

1. A piston for an internal combustion engine having a cylinder, a cylinder head closing an end of the cylinder and having an inner surface defining a combustion chamber, a spark plug mounted on the cylinder head, an intake valve mounted on the cylinder head on one of opposite sides of the spark plug and an exhaust valve mounted on the cylinder head on the other of the opposite sides of the spark plug, the piston being reciprocatingly disposed in the cylinder and having at the top surface a cavity for causing a mixture charge drawn into the combustion chamber so as to flow with a rotational motion about a horizontal axis upon opening of the intake valve to flow toward the spark plug, wherein the cavity is wider at an inlet than at an outlet and gradually becomes narrower toward the outlet when viewed in plan.

2. A piston according to claim 1, wherein the cavity extends from a place adjacently under the spark plug to a place under the exhaust valve, and wherein the cavity has a bottom surface that is inclined so as to cause the mixture charge to flow toward the spark plug.

3. A piston according to claim 2, wherein the cavity extends circumferentially to cause the mixture charge to flow circumferentially and has an end portion that is inclined so as to cause the mixture charge to flow toward the spark plug.

4. A piston according to claim 3, wherein the cavity further comprises a branch portion extending circumferentially therefrom for causing part of the mixture charge to flow separately.

5. A piston according to claim 4, wherein the branch portion of the cavity is wider at an inlet than at an outlet and becomes narrower gradually toward the outlet when viewed in plan.

6. A piston according to claim 2, wherein the bottom surface of the cavity is concavely curved when viewed in section.

7. A piston according to claim 1, wherein the inner surface of the cylinder head includes a pair of inclined surface sections that are inverted V-shaped when viewed in section so that the combustion chamber is pentroof-shaped.

8. A piston according to claim 7, wherein one of the inclined surface sections of the cylinder head is formed with an intake port and the other of the inclined surface sections is formed with an exhaust port.

9. A piston according to claim 8, wherein one of the inclined surface sections of the cylinder head is formed with a pair of said intake ports.

10. A piston according to claim 8, wherein the other of the inclined surface sections of the cylinder head is formed with a pair of said exhaust ports.

11. A piston for an internal combustion engine having a cylinder, a cylinder head closing an end of the cylinder and having an inner surface defining a combustion chamber, a spark plug mounted on the cylinder head, an intake valve mounted on the cylinder head on one of opposite sides of the spark plug and an exhaust valve mounted on the cylinder head on the other of the opposite sides of the spark plug, the piston being reciprocatingly disposed in the cylinder and having at the top surface a cavity for causing a mixture charge drawn into the combustion chamber so as to flow with a rotational motion about a horizontal axis upon opening of the intake valve to flow toward the spark plug, wherein the cavity is nearly C-shaped when viewed in plan and has opposite longitudinal end portions that are inclined so as to cause the mixture charge reaching the opposite longitudinal end portions to flow together toward the spark plug.

12. A piston according to claim 11, wherein the opposite longitudinal end portions of the cavity are bent so as to be generally straight and arranged in line and opposite to each other.

13. A piston for an internal combustion engine having a cylinder, a cylinder head closing an end of the cylinder and having an inner surface defining a combustion chamber, a spark plug mounted on the cylinder head, an intake valve mounted on the cylinder head on one of opposite sides of the spark plug and an exhaust valve mounted on the cylinder head on the other of the opposite sides of the spark plug, the piston being reciprocatingly disposed in the cylinder and having at the top surface a cavity for causing a mixture charge drawn into the combustion chamber so as to flow with a rotational motion about a horizontal axis upon opening of the intake valve to flow toward the spark plug, wherein the cavity is nearly C-shaped when viewed in plan and has opposite longitudinal end portions that are bent so as to be generally straight and arranged in line and opposite to each other.

* * * * *